United States Patent Office 3,390,176
Patented June 25, 1968

3,390,176
HIGHLY FLUORINATED SURFACE ACTIVE COMPOSITIONS AND PREPARATION THEREOF
Richard F. Sweeney and Henry R. Nychka, Randolph Township, Morris County, N.J., assignors to Allied Chemical Corporation, New York, N.Y., a corporation of New York
No Drawing. Continuation-in-part of application Ser. No. 373,035, June 4, 1964. This application Oct. 6, 1967, Ser. No. 673,265
10 Claims. (Cl. 260—539)

ABSTRACT OF THE DISCLOSURE

Highly fluorinated surface active compositions are prepared by reacting fluorine with a compound of the formula:

$$\begin{array}{c} C_nX_{2n} \\ X_2C \diagup \quad \diagdown CCl \\ X_2C \quad \quad CCl \\ \diagdown C \diagup \\ \parallel \\ O \end{array}$$

wherein X is independently selected from the group consisting of Cl and F and $n$ is 0 or 1, with the proviso that at least two of the X atoms are F, to form fluorinated intermediates followed by admixing the fluorinated intermediates with an aqueous alkaline solution to produce the highly fluorinated surface active compositions.

BACKGROUND OF THE INVENTION

This invention relates to highly fluorinated surface active compositions and intermediates for use in their preparation.

Highly fluorinated soaps with more than 6 carbon atoms and containing a hydrophilic group are valuable as emulsifiers, detergents, and as intermediates in the preparation of materials used in the treatment of textiles to render them oil and water repellent; however, they are difficult to prepare because direct fluorination of fatty acid soaps leads to extensive degradation and loss of the functional group. This was also found to be true in the case of carbonyl containing compounds, in general. Electrochemical and telomerization processes have been suggested for the preparation of these soaps, but poor yields were the results.

An object of this invention is to provide new and useful highly fluorinated surface active compositions. A further object is to provide highly fluorinated intermediates or precursors to be used in the preparation of the surface active compositions. A further object is to provide a novel process for the preparation of the surface active compositions and the precursors. Other objects will become apparent from the description which follows.

CROSS-REFERENCE TO RELATED APPLICATION

This application is a continuation-in-part application of co-pending application of Richard F. Sweeney and Henry R. Nychka, entitled "Highly Fluorinated Surface Active Compositions," Ser. No. 373,035, filed June 5, 1964.

SUMMARY OF THE INVENTION

In accordance with the aforementioned objects, the invention of this application is directed to the preparation of novel highly fluorinated surface active compositions and their highly fluorinated precursors by passing fluorine into intimate contact with a liquid starting material of the formula:

$$\begin{array}{c} C_nX_{2n} \\ X_2C \diagup \quad \diagdown CCl \\ X_2C \quad \quad CCl \\ \diagdown C \diagup \\ \parallel \\ O \end{array} \quad \text{I}$$

wherein X is independently selected from the group consisting of Cl and F and $n$ is 0 or 1, with the proviso that at least two of the X atoms are F, to effect fluorination. The highly fluorinated precursors which are produced not only have a higher fluorine content than the ketone starting materials, but, in addition, undergo molecular weight build-up and retain the carbonyl group. The retention of the carbonyl group is unexpected in view of the fact that when fluorine is reacted with carbonyl containing compounds other than those used herein degradation products are formed and the carbonyl group is lost. Similarly, the molecular weight build-up is unexpected in view of the fact that when cycloolefins or cycloalkanones are fluorinated, no molecular weight built-up takes place. In order for satisfactory fluorinated precursors to be produced in accordance with the invention it is necessary for the starting ketone material to be cyclic and have an unsaturated carbon to carbon double bond. The fluorinated precursors prepared in the described manner are then admixed with an aqueous alkaline solution, forming a carboxylic acid salt with exceptional surface active properties, the hydrophilic portion of the molecule being the carboxylic function and the hydrophobic portion being a fluorine containing segment of unknown structure.

Preferred starting materials are those of the formula:

$$\begin{array}{c} C_nF_{2n} \\ F_2C \diagup \quad \diagdown CCl \\ F_2C \quad \quad CCl \\ \diagdown C \diagup \\ \parallel \\ O \end{array} \quad \text{II}$$

wherein $n$ is as defined above.

The preferred starting materials are 1,2-dichlorotetrafluorocyclopentenone-3, $$\begin{array}{c} F_2 \diagup \diagdown Cl \\ F_2 \diagdown \diagup Cl \\ \parallel \\ O \end{array} \quad \text{III}$$

B.P. about 129° C. and 1,2-dichlorohexafluorocyclohexenone-3, $$\begin{array}{c} F_2 \\ F_2 \diagup \diagdown Cl \\ F_2 \diagdown \diagup Cl \\ \parallel \\ O \end{array} \quad \text{IV}$$

B.P. about 135° C.

1,2-dichlorotetrafluorocyclopentenone-3 is a known compound and has been prepared by heating a mixture of 1,2-dichloro-3,3-dimethoxytetrafluorocyclopentene and conc. $H_2SO_4$ at 35° C. (Dissertation Abstract of Donald H. Campbell, Ph.D., Purdue University, February 1955, "The Synthesis and Reactions of Certain Fluorine-Containing Alkanes, Cycloalkenes and Ketones.")

All the other ketones within the scope of Formula I can be prepared by the analogous procedure of reacting corresponding 3,3-dimethoxyperhalocycloalkenes with conc. $H_2SO_4$.

Other preparations of the starting materials of Formulae III and IV are disclosed in application of Richard F. Sweeney and Henry R. Nychka, entitled "Preparation of Pyrosulfuryl Fluoride and By-Products," Ser. No. 373,057, filed June 5, 1964, now U.S. Patent 3,330,624 and application of Richard F. Sweeney, Louis G. Anello, Melvin M. Schlechter and Benjamin Veldhuis, entitled "Dihalohexafluorocyclohexanones," Ser. No. 373,058, filed June 5, 1964, now U.S. Patent 3,333,002. Both of the aforementioned patents were co-pending with parent case Ser. No. 373,035 of which this application is a continuation-in-part.

U.S. Patent 3,330,624 discloses a process for preparing 1,2-dichlorotetrafluorocyclopentenone-3 and 1,2-dichlorohexafluorocyclohexenone-3 by reacting 1,2-dichlorohexafluorocyclopentene-1 and 1,2-dichlorooctafluorocyclohexene-1, respectively, under substantially anhydrous conditions, with $SO_3$, in the presence of a small amount of a pentavalent antimony compound as catalyst. Other compounds within the scope of Formula I can be prepared by analogous reactions.

U.S. Patent 3,333,002 discloses a process for preparing 1,2-dichlorohexafluorocyclohexenone-3 by reacting 1,2-dichlorooctafluorocyclohexene-1 with sulfur trioxide in the presence of a catalyst selected from the group consisting of boric oxide, trimethylboroxine, borax, sodium and potassium fluoborates, methyl borate, boric bromide, boric iodide, boric carbide, boric chloride, boric fluoride, boric hydride, boric nitride, boric silicide, boric sulfide and pentavalent antimony halides. Other compounds within the scope of Formula I can be prepared by analogous reactions.

A starting material within the scope of Formula I is selected and placed in a reaction vessel, which can be constructed of ordinary laboratory glassware. The vessel can be equipped with a stirrer or other agitating means to insure intimate contact between the reactants. Florine is introduced into the reaction vessel continuously or intermittently and from any point therein provided it passes into intimate contact with the liquid starting material.

The reaction can be conducted over a wide temperature range, provided by external means, from about 0° C. to about reflux temperature. The reaction temperature is not critical and the reaction would proceed over an even wider range of temperatures. The limiting factor on the low side of the temperature range is the increase in viscosity of the liquid phase as the temperature is reduced substantially below 0° C. No advantages are derived from operation at temperatures below 0° C. The limiting factor on the high side of the temperature range is the reflux temperature of the organic mixture. When operating temperatures are raised substantially above room temperature, the amount of breakdown of the organic material increases, leading to reduced yields of the product boiling in certain desired ranges. The preferred temperature range of the reaction is about 25° to about 60° C. The temperature can be controlled by limiting the rate of fluorine flow into the reactor or by means of external cooling.

The fluorine can be used independently, but is usually mixed with $N_2$ or another inert gas such as helium. The ratio of inert gas to fluorine is not critical. Since the reaction is exothermic, the use of diluted fluorine in the initial stages of the reaction makes it easier to control the reaction temperature.

The ratio of mols of inert gas to mols of fluorine may vary from 4 to 1 in the initial stages of the reaction to essentially pure fluorine in the latter stages of the reaction. The total number of mols of fluorine passed into the reactor should be sufficient to insure saturation of all carbon-carbon double bonds in the reaction mixture. The actual fluorine utilization will depend on a variety of factors such as apparatus design, the depth of immersion of the gas inlet dip-tube, the rate of gas flow, the degree of nitrogen dilution of the fluorine, etc. If the reaction is run under conditions in which the fluorine utilization is poor, a large excess of fluorine must be used relative to the mols of organic material in the reaction flask. Even with reduced flows, the fluorine utilization is not quantitative, particularly, when the fluorine is diluted with an inert gas. It is usually necessary to pass an excess of fluorine into the reactor. In general, the faster the flow rate and the greater the dilution of fluorine, the poorer the fluorine utilization. It was found that the reaction proceeded in a satisfactory manner when fluorine was passed into the flask at rates varying from about 0.05 mol/hr. to as high as 0.2 mol/hr.

The reaction time depends upon the amount of organic material, the rate of fluorine flow and the degree of fluorine utilization. The reaction is complete when the infrared absorption spectrum of the reaction mixture shows no carbon-carbon unsaturation.

The reaction pressure is preferably atmospheric, but can be super-atmospheric or sub-atmospheric, although no advantage accrues therefrom.

The result of the passage of elemental fluorine into the selected ketone starting material under the aforementioned conditions, is a highly fluorinated precursor for surface active compositions. The precursor is a water white liquid mixture of compounds, having more fluorine than the starting material and which retains the carbonyl group of the starting material, but not the double bond. It has been ascertained that fluorine does not simply add to the unsaturated double bonds of the starting material but causes a molecular weight build-up in the product. It is theorized that the cyclic structure is also retained and that the ring is cleaved by the action of the aqueous alkaline solution on the precursor.

Although all the highly fluorinate liquid precursors, which may be prepared as above described, on admixture with an aqueous alkaline solution, yield compositions with good surface active properties; it has been found that the extent of molecular weight build-up in the fluorinated precursors bears a relationship to the surface activity in the final product. Generally, the higher the molecular weight build-up, the higher the surface activity. The preferred molecular weight for fluorinated percursors made from the starting material of Formula III, to yield surface active compositions of optimum qualities, is about 400–750. The preferred molecular weight for fluorinated precursors made from the starting material of Formula IV, to yield surface active compositions of optimum qualities, is about 485–665. Boiling point is an indication of molecular weight. It has been found, for example, that an intermediate boiling fraction of the fluorinated precursor prepared from the starting material of Formula III, i.e., the fraction which on distillation distills over at about 64°–135° C. at 3 mm. pressure, corresponds to the preferred average molecular weight range of about 400–750. (Lower boiling points correspond to lower molecular weights and vice-versa.) Desired boiling point ranges for fractions of other fluorinated precursors within the scope of Formula I, may be determined by routine experimentation. The most convenient way to separate the desired fractions is by fractional distillation.

The entire precursor or the desired fraction thereof is admixed with an aqueous alkaline solution thereby converting the precursor to a surface active composition. The aqueous alkaline solution can be a solution of an alkali metal hydroxide, ammonium hydroxide, alkaline earth metal hydroxide or the corresponding carbonates.

The concentration of the aqueous alkaline solution is not critical and may vary over a wide range. The use of too concentrated an alkali solution makes it difficult to avoid an excess of alkali. On the other hand, the use of too dilute a solution results in large volumes of liquid from which the water must be removed in order to recover the surface active agent. When sodium hydroxide is used as the alkali, the alkali concentration may run as high as 50 wt. percent but the preferred range is between 4 and 10 wt. percent solutions of sodium hydroxide in water.

The reaction of the precursor with the aqueous alkali medium is complete when the pH of the reaction mixture becomes slightly alkaline and preferably has a pH between 7.0 and 8.0.

The reaction with the alkali is not instantaneous. The alkali is added portionwise at such a rate that the pH of the reaction mixture does not exceed 8.0. The pH may be determined by any of the conventional laboratory methods of measuring pH such as a Beckman pH meter or by the use of pH paper.

The neutralization reaction is exothermic. The temperature of the reaction mixture is not critical and may vary from room temperature to the boiling point of the solution.

If a pH meter is used the temperature of the reaction mixture is maintained within the operating range of the electrode used.

The reaction mixture is preferably evaporated to dryness leaving a residue which is further dried, e.g., under a vacuum and in the presence of a desiccant, to form crystalline residues which demonstrate strong surface activity in aqueous solution.

DESCRIPTION OF THE PREFERRED EMBODIMENTS

Parts and percentages in the following examples are by weight.

Example I

A 100 ml. 3-neck flask fitted with a condenser, gas inlet dip tube and a thermowell was charged with 169.7 parts of 1,2-dichlorotetrafluorocyclopentenone-3. An elemental nitrogen-fluorine mixture was passed into the flask by the gas inlet dip tube for 24 hours. The ratio of nitrogen to fluorine varied from about 2 to 1 at the beginning to about 1 to 2 at the end of the reaction period. The flow of fluorine into the flask varied from 0.06 mol/hr. initially to 0.14 mol/hr. at the end of the reaction period. The reaction vessel was not heated and the temperature therein did not exceed 48° C. At the conclusion of the reaction period 150.3 parts of water white liquid, with a viscosity greater than the starting material was recovered. The highly fluorinated intermediate showed a strong carbonyl absorption in the infrared at 5.5 microns and showed no carbon-carbon double bond absorption at 6.25 microns. The latter absorption is characteristic of the starting unsaturated ketone.

The organic liquid derivative was separated into four fractions by distillation, under vacuum as follows:

|  | Percentage | B.P. (° C.) at 3 mm. pressure |
|---|---|---|
| 1st fraction | 25.4 | <64 |
| 2nd fraction | 35.4 | 64–124 |
| 3rd fraction | 17.5 | 124–135 |
| 4th fraction | 21.7 | >135 |

The 2nd fraction was redistilled under vacuum and a center cut boiling at 43–49° C. at 1 mm. pressure was assayed for fluorine and chlorine. There was 42.5% fluorine and 26.0% chlorine present in the sample. A sample of the 3rd fraction was assayed for fluorine and chlorine. There was 41.0% fluorine and 28.1% chlorine in the sample. This compared with 34.0% fluorine and 31.8% chlorine in the starting ketone.

Portions of the entire mixture, the 2nd and 3rd fractions combined, and the 2nd and 3rd fractions separately, were reacted with a 1 N sodium hydroxide solution to give an aqueous solution with a pH of 7 to 8. The aqueous solution was evaporated to leave a residue which was further dried under vacuum over $P_2O_5$ at 110° C. The crystalline residue showed strong surface activity in aqueous solution. The surface tensions of each of the four aqueous solutions are shown in Tables I–IV as follows:

TABLE I.—SURFACE TENSION OF AN AQUEOUS SOLUTION OF A PORTION OF THE ENTIRE ORGANIC LIQUID DERIVATIVE, I.E., FRACTIONS 1–4

| Concentration, wt. percent | Surface tension, 28° C. dynes/cm. |
|---|---|
| 1.3 | 27.1 |
| 0.78 | 27.0 |
| 0.46 | 27.5 |
| 0.28 | 27.5 |
| 0.17 | 29.1 |
| 0.07 | 34.0 |

TABLE II.—SURFACE TENSION OF A SOLUTION OF A PORTION OF THE 2ND AND 3RD FRACTION DERIVATIVES COMBINED

| Concentration, wt. percent | Surface tension, 28° C. dynes/cm. |
|---|---|
| 1.3 | 28.1 |
| 0.78 | 28.0 |
| 0.46 | 28.5 |
| 0.28 | 28.5 |
| 0.17 | 30.1 |
| 0.07 | 35.0 |

TABLE III.—SURFACE TENSION OF A SOLUTION OF A PORTION OF THE 2ND FRACTION DERIVATIVE

| Concentration, wt. percent | Surface Tension, 28° C. dynes/cm. |
|---|---|
| 5.4 | 28.1 |
| 2.1 | 28.1 |
| 1.3 | 28.0 |
| 0.78 | 27.1 |
| 0.46 | 27.6 |
| 0.28 | 27.6 |
| 0.17 | 29.7 |
| 0.07 | 37.8 |

TABLE IV.—SURFACE TENSION OF A SOLUTION OF A PORTION OF THE 3RD FRACTION DERIVATIVE

| Concentration, wt. percent | Surface tension, 28° C. dynes/cm. |
|---|---|
| 1.3 | 28.2 |
| 0.77 | 28.8 |
| 0.46 | 29.3 |
| 0.28 | 29.3 |
| 0.17 | 30.5 |
| 0.067 | 32.3 |

Example II

Fifteen parts of 1,2-dichlorohexafluorocyclohexenone-3 were reacted with fluorine diluted with $N_2$ in a volume ratio of 2 to 1. The rate of flow was .044 mol of fluorine per hour so that 0.3 mol of fluorine passed over the ketone in 6.8 hours. The reaction temperature was 23°–40° C. Periodic examinations of the fluorination mixture by infrared analysis showed the gradual disappearance of the double bond band at 6.3 microns with the simultaneous shifting of the carbonyl band from 5.7 microns to 5.5 microns. The yield was 10.5 parts of product. The product was a water-white liquid with a viscosity greater than the starting material and a molecular weight of 485. Product analysis: percent F, 44.0; percent Cl, 23.3. The initial ketone was 41.8% F and 26.0% Cl. The product was rendered alkaline as in Example I, supra, and it foamed copiously.

Example III

One hundred forty parts of 1,2-dichlorohexafluorocyclohexenone-3 was reacted with fluorine diluted with $N_2$ just as in Example II except that the rate of flow was .11 mol/hour. The total amount of fluorine used was 2.7 mols in a 24.5 hour period. The results obtained were the same as in Example II.

We claim:
1. A method for preparing highly fluorinated compositions, suitable as intermediates in the preparation of sur- face active compositions, comprising passing $F_2$ into intimate contact with a liquid ketone of the formula:

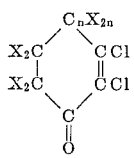

wherein X is independently selected from the group consisting of Cl and F and $n$ is 0 or 1, with the proviso that at least two of the X atoms are F, to effect fluorination together with molecular weight build-up and retention of the carbonyl group.

2. A method for preparing highly fluorinated compositions, suitable as intermediates in the preparation of surface active compositions, in accordance with claim 1 in which the liquid ketone has the following formula:

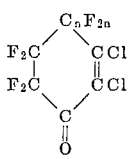

wherein $n$ is 0 or 1.

3. A method for preparing highly fluorinated compositions, suitable as intermediates in the preparation of surface active compositions, in accordance with claim 1 in which the liquid ketone has the following formula:

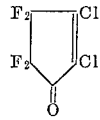

4. A method for preparing highly fluorinated compositions, suitable as intermediates in the preparation of surface active compositions, in accordance with claim 1 in which the liquid ketone has the following formula:

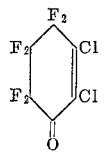

5. A method for preparing highly fluorinated surface active compositions which comprises admixing a fluorinated compositions produced in accordance with claim 1 with an aqueous alkaline solution to produce the corresponding highly fluorinated surface active composition, and separating the highly fluorinated surface active composition therefrom.

6. A method for preparing highly fluorinated surface active compositions in accordance with claim 5 in which the liquid ketone has the following formula:

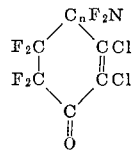

wherein $n$ is 0 or 1.

7. A method for preparing highly fluorinated surface active compositions in accordance with claim 5 in which the liquid ketone has the following formula:

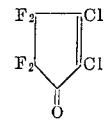

8. A method for preparing highly fluorinated surface active compositions in accordance with claim 5 in which the liquid ketone has the following formula:

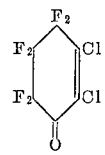

9. A highly fluorinated composition prepared by the process defined in claim 1.

10. A highly fluorinated surface active composition prepared by the process defined in claim 5.

References Cited

UNITED STATES PATENTS

| | | | |
|---|---|---|---|
| 2,985,684 | 5/1961 | Pennino | 260—539 XR |
| 3,129,248 | 4/1964 | England | 260—539 XR |
| 3,232,970 | 1/1966 | Hauptschein et al. | 260—539 XR |
| 3,346,645 | 10/1967 | Weil | 260—586 |

OTHER REFERENCES

Fukuhara et al., J. Am. Chem. Soc., vol. 63, pp. 788–791 (1941).

Hudlicky, "Chemistry of Organic Fluorine Compounds," pp. 68–70 (1962).

LORRAINE A. WEINBERGER, *Primary Examiner.*

A. P. HALLUIN, *Assistant Examiner.*